M. A. REYNOLDS.
Truck.
No. 226,106 — Patented Mar. 30, 1880.
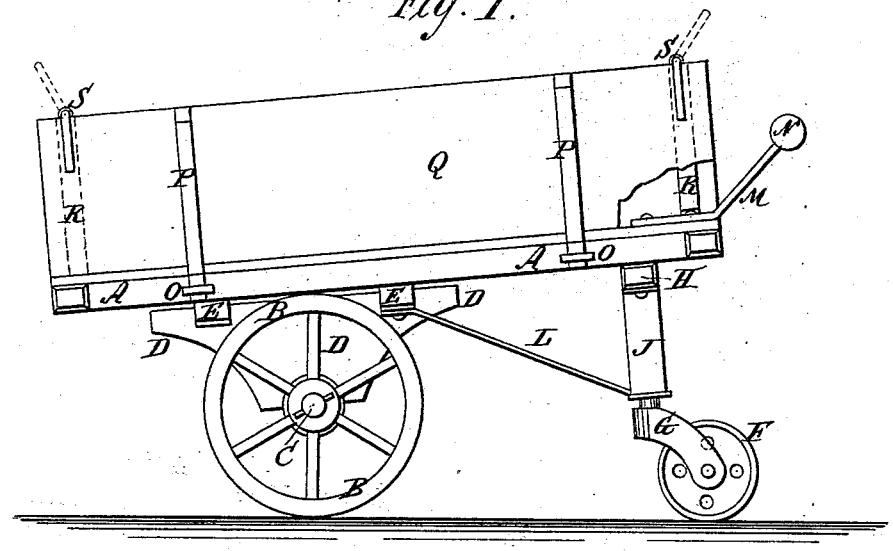
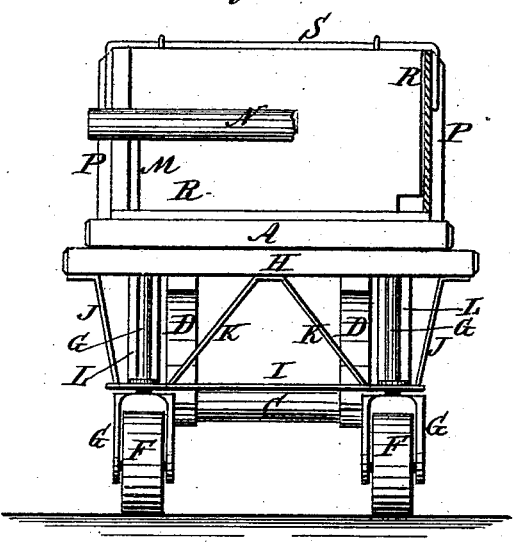
WITNESSES:
A. Schehl.
C. Sedgwick
INVENTOR:
M. A. Reynolds
BY Munn & Co
ATTORNEYS.

UNITED STATES PATENT OFFICE.

MONTGOMERY A. REYNOLDS, OF STANTON, MICHIGAN.

TRUCK.

SPECIFICATION forming part of Letters Patent No. 226,106, dated March 30, 1880.

Application filed February 11, 1880.

*To all whom it may concern:*

Be it known that I, MONTGOMERY A. REYNOLDS, of Stanton, in the county of Montcalm and State of Michigan, have invented a new and useful Improvement in Trucks, of which the following is a specification.

Figure 1 is a side elevation of the improvement. Fig. 2 is an end elevation, partly in section.

The object of this invention is to furnish trucks for use in mills, warehouses, railroad-depots, and other places, which trucks shall be simple in construction and convenient in use.

The invention consists in constructing a truck of a frame, wheels, and axle, two caster-wheels supported by a cross-bar and braces, and a box held together by rock-rods having locking-arms upon their ends, as will be hereinafter fully described.

Similar letters of reference indicate corresponding parts.

A represents the frame or platform of the truck. B are the main or large wheels, which revolve upon the journals of the axle C. The axle C revolves in bearings in blocks or brackets D, attached to the frame A or to cross-bars E, attached to the said frame A in such positions that the wheels B may be between the center and the end of the truck.

F are two caster-wheels, the standards G of which are swiveled to head-blocks or a cross-bar, H, attached to the longer end part of the frame A. The lower parts of the standards G also work in holes in the ends of the cross-bar I. The standards G are held from lateral movement by the inclined braces J and K, attached to the cross-bar I at their lower ends, and at their upper ends to the cross-bar H or to the frame A. The standards G are further strengthened in position by the inclined braces L, the lower ends of which are attached to the cross-bar I near the standards G. The upper ends of the braces L are attached to one of the cross-bars E or to the frame A.

To the corners of the frame A next the caster-wheels F G are attached two arms, M, to the outer ends of which is attached a cross-bar, N, the arms M and cross-bar N serving as a handle in moving the truck.

To the outer sides of the side bars of the frame A are attached sockets or keepers O, to receive the lower ends of the stakes P, attached to the side boards, Q, of the box.

In the inner sides of the end parts of the side boards, Q, are formed grooves to receive the ends of the end boards, R.

S are rods, which extend along the upper edges of the end boards, R, and work in keepers or bearings attached to the said edges. The ends of the rods S are bent at right angles to overlap the side boards, Q, and thus bind the side and end boards firmly together.

With this construction, by turning the arms of the locking-rods S upward, as indicated in dotted lines in Fig. 1, the outward pressure of the loading will spring the released ends of the side boards, Q, outward, releasing the end board, R, and allowing it to be readily removed.

The truck may be used with or without the box R Q S, as the character of the substance to be moved may require.

Having thus fully described my invention, I claim as new and desire to secure by Letters Patent—

A truck constructed substantially as herein shown and described, consisting of the frame A, the main wheels B, the axle C, the bearing-blocks D, the two caster-wheels G, the cross-bars H I, the braces J K L, the box Q R, and the locking-rods S, all constructed and operating as set forth.

MONTGOMERY A. REYNOLDS.

Witnesses:
ARTHUR L. PAINE,
C. D. EASTERBROOK.